Feb. 21, 1933.    J. J. NAUGLE    1,898,203
METHOD OF REFINING SUGAR AND THE LIKE
Original Filed July 28, 1928    5 Sheets-Sheet 1

John Jay Naugle Inventor
By his Attorney
Edward M. Evarts

Feb. 21, 1933.    J. J. NAUGLE    1,898,203
METHOD OF REFINING SUGAR AND THE LIKE
Original Filed July 28, 1928    5 Sheets-Sheet 4
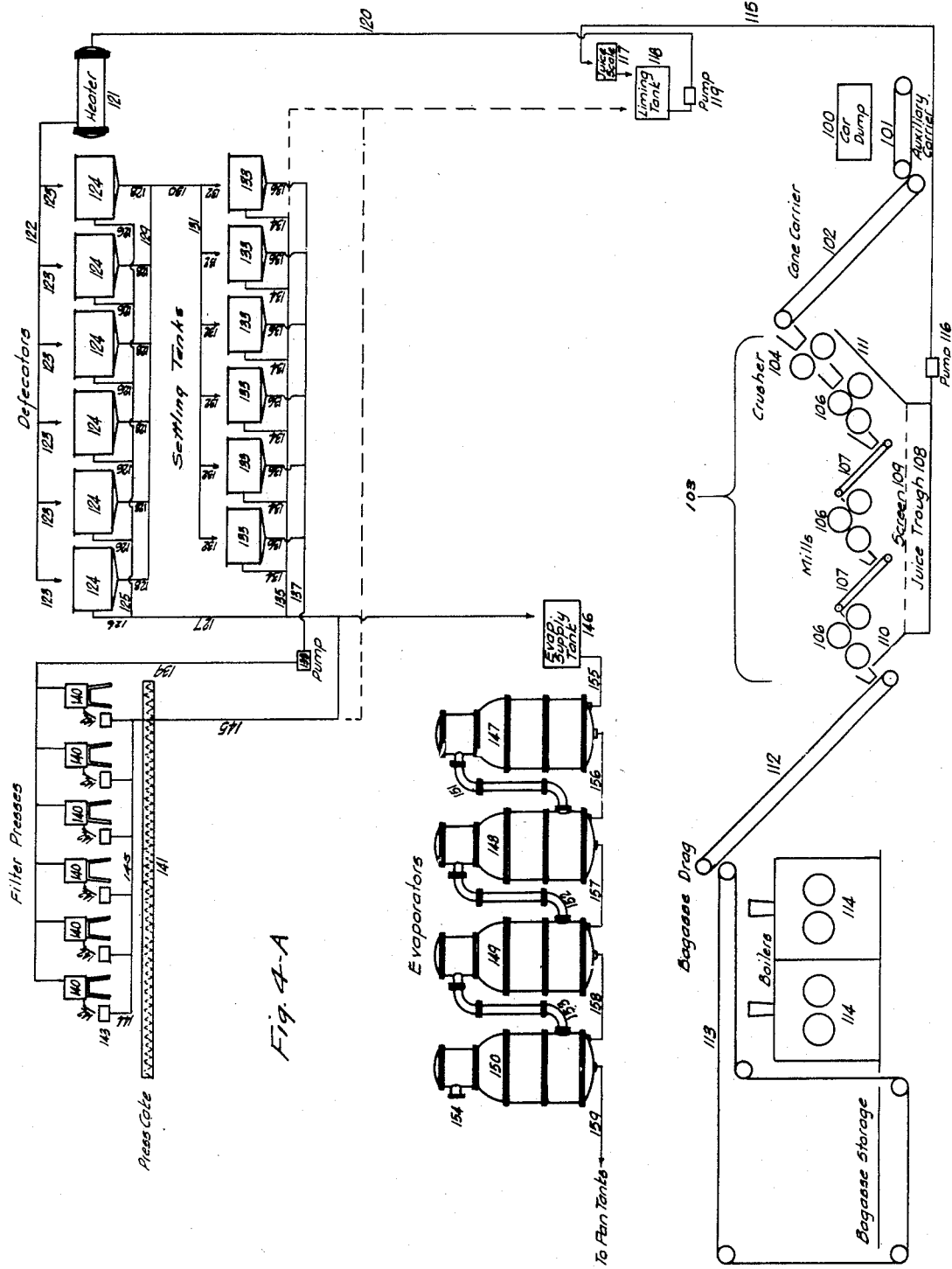
Fig. 4-A
John Jay Naugle Inventor
By his Attorney
Edward M. Evarts

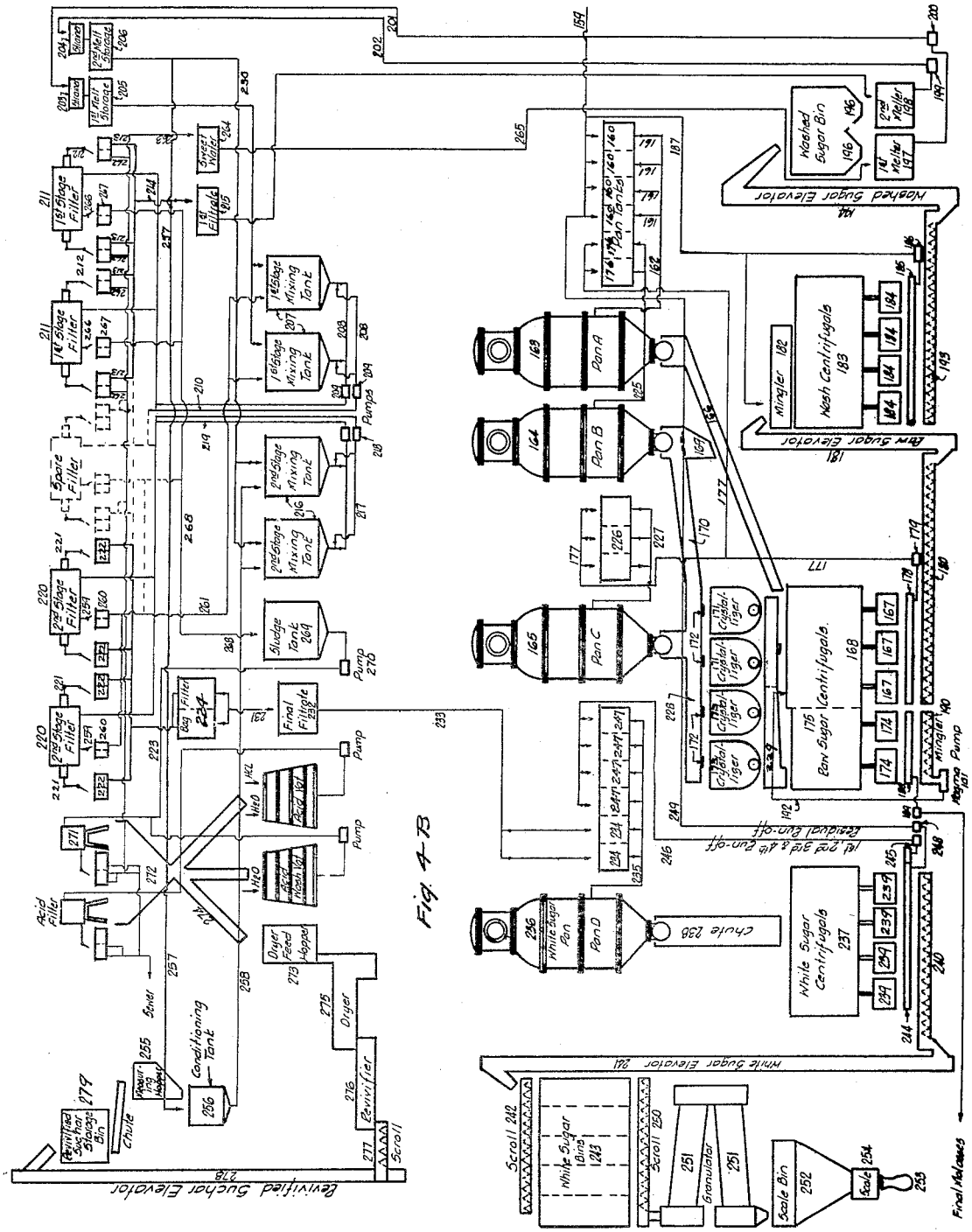
Fig. 4-B

Patented Feb. 21, 1933

1,898,203

UNITED STATES PATENT OFFICE

JOHN J. NAUGLE, OF RYE, NEW YORK

METHOD OF REFINING SUGAR AND THE LIKE

Application filed July 28, 1928, Serial No. 295,880. Renewed June 24, 1932.

My present invention relates to methods of manufacturing sugar, particularly but not exclusively from sugar cane, since the principles of the methods of the present invention may also be successfully applied to the manufacture of sugar beets, Jerusalem artichokes and other surcrose-bearing plants. It is an object of the present invention to devise methods of the general character specified by the use of which important economies may be effected in the manufacturing of sugar and by the use of which, also, certain advantages in operation, and certain simplifications of the equipment and certain reductions of the space required for such equipment in the manufacture of sugar may be brought about. While not limited thereto, the principles of the present invention are particularly applicable to the combined manufacture, in a substantially continuous manner, of raw sugar and of refined or granulated sugar from such raw sugar, the manufacture of the raw sugar being so conducted as to combine most effectively and in a highly economical manner with the subsequent manufacture from such raw sugar of the refined or granulated sugar itself, and the manufacture of the refined or granulated sugar being so conducted as to utilize in the most economical manner the sugar values obtained in the raw sugar fraction of the process, certain byproducts of the fraction of the process relating more particularly to the manufacture of the refined or granulated sugar being returned to and reintroduced, at a suitable stage or stages, into the raw fraction of the process, in this way to increase the yield of refined sugar, to reduce losses of sugar values, to reduce costs, simplify equipment and to bring about other advantages and gains in efficiency and certain economies in the combined sugar manufacturing process. Other objects and advantages of the methods of the present invention will in part be pointed out in detail hereinafter and will in part be obvious to those skilled in the art to which the present invention relates.

In the accompanying specification I shall describe, and in the annexed drawings more or less diagrammatically exemplify, several illustrative embodiments of the methods of the present invention. It is, however, to be clearly understood that my invention is not limited to the specific embodiments thereof herein shown and more or less diagrammatically exemplified for purposes of illustration only. In the accompanying specification I shall also describe, and in the annexed drawings show, an illustrative arrangement of apparatus which may be successfully and economically utilized in the practise of one or more of the aforesaid illustrative embodiments of the processes of the present invention. It is, however, to be clearly understood that the aforesaid illustrative arrangement of apparatus is not limited in its use to the practise of any of the aforesaid illustrative embodiments of the methods of the present invention, nor are such illustrative embodiments of the methods of the present invention, or any of them, restricted to their practise by the use of the specific arrangement of apparatus herein illustrated, the apparatus forming no part of the present invention but being more fully described and being fully claimed in a copending application of mine filed of even date herewith bearing Serial No. 295,881 and entitled "Means for refining sugar and the like".

Referring to the drawings, wherein I have more or less diagrammatically exemplified the aforesaid illustrative embodiments of the methods of the present invention and the aforesaid illustrative arrangement of apparatus for practising one or more of such embodiments of the methods:

Figs. 4A and 4B are diagrammatic views indicating the layout of one arrangement of the apparatus which may be utilized for practising one or more of the aforesaid illustrative embodiments of the methods of the present invention.

Figure 1:
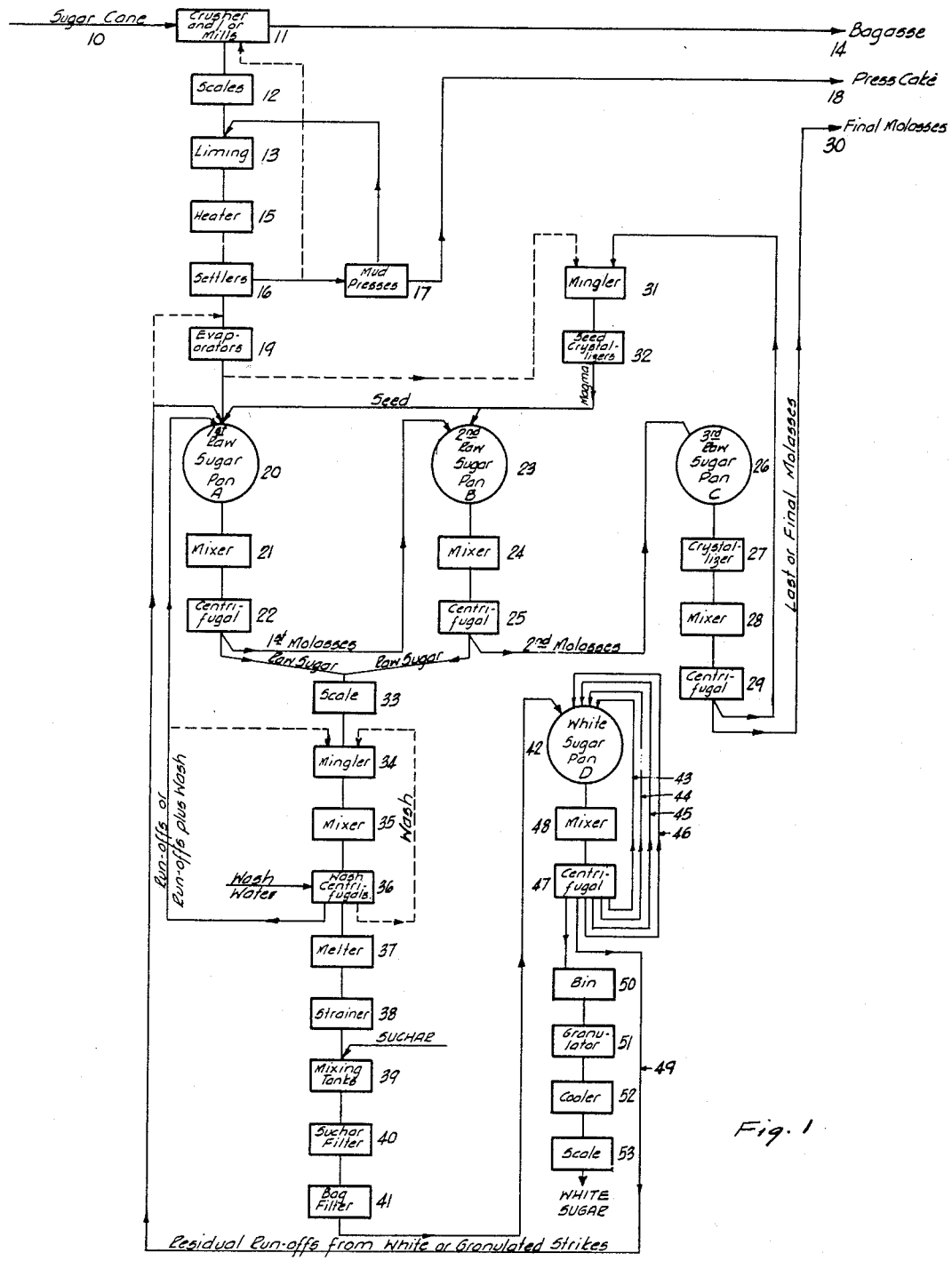
Fig. 1 is a diagrammatic view exemplifying one embodiment of the processes of the present invention.

Before describing the aforesaid illustrative embodiment of the methods of the present invention and the aforesaid illustrative arrangement of the apparatus which may be used for practising such embodiments, it may be desirable briefly to outline the disadvaneages and shortcomings of the prior art, particularly as the same relates to the manufacture of refined or granulated sugar by the methods hitherto commonly employed for that purpose. Hitherto the operations of making refined or granulated sugar have been divided into two separate and distinct manufacturing processes generally practised large distances apart and each separately requiring expensive and elaborate equipment, often duplicated in the two installations without economic justification for such duplification and resulting, as a result of the separation of the two portions of the process, in substantial mechanical and economic losses, increased expenses due to the much longer time required for the final manufacturing process, increased insurance, overhead and freight charges, and much more expensive equipment. There are additional losses and increased expenses due to the requirement that in transferring the intermediate product, in the form of raw sugar, to the location where the same is converted into the final or end product, namely, refined or granulated sugar, the intermediate product, namely raw sugar, has to be bagged, shipped and handled, all of this adding greatly to the expense of the final product and greatly diminishing the efficiency of the manufacturing process, both from the point of view of the final yield and of the cost of the finished product. The manufacture of refined or granulated sugar by this method entails also the additional and very serious problem of the ultimate disposition of certain by-products of the manufacture of refined or granulated sugar from the raw sugar, these by-products being in the nature of affinations and run-offs which can not be economically handled at the refinery which was not particularly well adapted to so handle these by-products of the refining process.

These disadvantages and resulting losses in yield and in economies have to a great extent been overcome and certain important advantages and economies rendered possible by means of the methods of the present invention. I have discovered and have, after numerous tests, experiments and demonstrations, found and am now demonstrating on a commercial scale, that certain unexpected but very substantial advantages and marked economies in equipment, operation and final yield of the desired end product may be effected by combining the two hitherto separate processes of manufacturing raw and of manufacturing refined or granulated sugar in a single, unitary and substantially continuous or cyclic process by means of which the raw sugar is manufactured in a most economical manner, and is thereafter refined by a portion of the combined, unitary process, likewise in a most economical manner, the by-products from the refining portion of the process being returned to one or more stages of the fraction of the process relating to the manufacture of the raw sugar, for reconversion into raw sugar which is itself refined, the cyclic or substantially continuous process thus rendered possible bringing about maximum yields of a high quality product, maximum economies, avoidance of duplication of equipment, and other advantages in operation which will more fully appear from the later portions of this specification.

Referring now to the aforesaid illustrative embodiment of the methods of the present invention, and with particular reference to the embodiment of the invention diagrammatically exemplified in Fig. 1 of the drawings, 10 indicates the sugar cane or other source of sucrose which goes, in the case of sugar cane, to the crushers or mills, or combined crushers and mills, as indicated by reference character 11. Here the sugar cane is crushed and macerated, the juices passing by way of the juice scales 12 to the liming or other treating tank 13. It may here be stated that instead of juice scales 12, measuring tanks or other means may be employed for determining the volume of the juices, so as to enable the process to be properly controlled from start to finish. The waste fibrous and other vegetable matter from which the juices have been extracted passes out of the system at the point 14, such waste vegetable matter in the case of sugar cane comprising the material known as bagasse. It may here be stated that the bagasse may either be burned as fuel in the boilers or it may be stored and converted into wall-board or used for any other desired purpose.

In the tank or tanks 13 the juices may be limed or similarly treated to fit them for the subsequent defecation process. In the case of liming, an amount of lime is added to the juices depending upon their chemical constitution, particularly the acidity of the juices and the amount of organic impurities which they may contain, as will readily occur to those skilled in the art to which the present invention relates. From the liming tank or tanks 13, or their equivalents, the limed juices go to the heater or heaters 15 where the limed juices are heated to a temperature about equal to their boiling point, sometimes exceeding the boiling point, although sometimes temperatures below the boiling point may be utilized, the purpose being to utilize such a temperature as will best facilitate the desired purifying, such as defecating action. The temperature to be used in any particular case may be readily determined by trial and experiment and will depend upon the particular juices being treated.

After being heated in the heaters 15 the clear juices may be separated from the scums and muds either by a continuous or by an intermittent decantation process by the use of the settlers 16. It may here be stated that the mingled scums and muds may be passed to supplementary settling tanks for the recovery of entrained juices which are decanted in the same manner as the main batch of juices. From the supplementary settler tanks the mingled scums and muds may be sent to mud presses 17 from which the recovered juices may be returned to the system at any desired point or points, preferably for being limed again in the liming tanks 13.

The cake from the mud presses 17 leaves the system at the point 18 in the form of press cake which may be used for fertilizer, fuel or other purposes. It may here be stated that instead of sending the mixed scums and muds through the second settling operation, which has itself not been illustrated in full detail since such illustration is here deemed to be unnecessary, such mixed scums and muds may be reintroduced into the system at some point of the crusher or mill mechanism so that in this way the mills, rather than the mud presses, will serve to recover the juices entrained in the scums and muds and thus reintroduce them back into the system.

From the settlers 16 the clarified juices go to the evaporators 19 which serve to convert the clarified juice by a process of concentration to a syrup of suitable density, generally from about 28 to about 32 degrees Beaumé, generally about 30 degrees Beaumé. In this condition the concentrated juices, now a syrup, are generally called "meladura". The color of the meladura will, of course, depend upon the amount of colloidal and other impurities present in it and will generally approximate a fairly dark cloudy brown color.

From the evaporators the concentrated juices or "meladura" goes to the vacuum pan designated A, which may be called the first raw sugar pan and which has also been designated by reference character 20. Here, by the further concentration of the "meladura", the crystallization of the sugar takes place forming a mass of crystals in the mother liquor generally called "massecuite". The mother liquor is in the nature of a high-grade molasses.

From the first raw sugar pan or pan A the "massecuite" is passed to a container generally called a mixer 21 with which is associated one or more centrifugals or equivalent devices for separating the raw sugar crystals from the mother liquor, the centrifugals being generally designated by reference character 22. Ordinarily the mixer is positioned over a battery of centrifugals to which the "massecuite" may be fed in the desired quantities depending upon the capacity of the centrifugals and upon the rate at which they are being operated. The centrifugals or like devices serve to separate the raw sugar crystals from the mother liquor, the mother liquor or first molasses being sent to the second raw sugar pan or pan B designated by reference character 23, in which pan this first molasses is in turn converted into raw sugar which in its turn goes to the mixer 24 and the associated centrifugals 25 in the manner described for the first raw sugar pan and its associated mixer and centrifugals, the run-off in this case, designated second molasses, being in its turn sent to the third raw sugar pan or pan C, designated by reference character 26, for conversion into raw sugar which, with its mother liquor, is sent to the crystallizers or equivalent device 27 where the further exhaustion of the mother liquor in the formation of raw sugar crystals is permitted to continue, crystallization being slower as the purity or concentration of the liquor in sucrose diminishes.

From the crystallizers or equivalent devices 27 the mass of raw sugar crystals and mother liquor is sent to the mixer 28 from which it passes to the centrifugals 29 as in the case of the associated mixers and centrifugals already described, the run-off in this case constituting the last or final molasses being designated by reference character 30.

It may here be stated that the purpose of the successive crystallizations in the pans A, B and C is to remove as much of the sucrose in crystalline form as is economically expedient, considering the time and other factors involved, sucrose being in its pure form a crystalline substance known to the consumers as refined or granulated sugar and in the form of raw sugar comprising sucrose crystals with certain impurities the greater part of which is on the surface of the crystals from which they may be readily removed by a washing operation which will be subsequently described. It may here further be stated that in the average case the raw sugar from the first raw sugar pan A will be of slightly in excess of 96 degrees polarization, while the raw sugar from pan B will be generally slightly less, so that the raw sugars from pans A and B when mixed together will generally average about 96 degrees polarization.

It may here further be stated that under certain conditions, as more fully set forth later in this specification, it may be possible, by certain manipulations there made clear, to obtain raw sugar of average purity of about 98 degrees or even higher, a degree of purity which is highly desirable in certain forms of the methods of the present invention for certain particular results desired to be obtained. The raw sugar from the third raw sugar pan or pan C, on the other hand, is of substantially lower purity, sometimes as low as 88 degrees polarization, or even lower, or sometimes as high as 94 degrees polarization, or even higher, depending upon the character of juices being treated and their method of treatment. Accordingly, the raw sugar from the third raw sugar pan or pan C is not ordinarily mixed directly with the raw sugars coming from pans A and B, but is generally handled in some other manner, such as being used for seeding purposes in a manner which will now be described.

As indicated in the preceding paragraph, the raw sugar coming from the centrifugals 29 is mixed with a sufficient amount of meladura in a mingler 31 (with meladura coming from the evaporators 19) to enable it to be pumped or otherwise expeditiously transferred to the seed crystallizers or similar devices 32, the purpose of which is to form a mass or "magma" which may be utilized, by its introduction into either pan A or pan B, or into both of such pans as seed. By this method of boiling the sugar crystals introduced into the pan in the form of "magma" are made to grow at the expense of sucrose from the meladura or mollasses subsequently fed to the pan while boiling, until the crystals reach the desired size and the mass has been brought to the desired density. In this way the lower quality sugar from pan C is used as a base for the production of the desired quality of raw sugar. By making use of this lower quality sugar from pan C as seed or a footing for a strike, the necessity of forming grain for the strike from the meladura as described for pan A is eliminated with a resultant saving in time required to boil the strike.

It may here be stated, further, that in certain cases the relatively impure raw sugars from the centrifugals 29, instead of being mixed with meladura and sent to the seed crystallizers may be mixed not with meladura but with the first mollasses or run-off from the sugar in the centrifugals 22 and reintroduced into the centrifugals 22 also with massecuite from pan A. After being repurified or purified in this manner raw sugars of 95 degrees polarization, or even higher result.

In certain cases it may be desirable to produce sugars of even higher purity, as raw sugars having 98 to 99 purity. This result may be effected by more careful or double defecation or by utilizing any other expedients which will give this desired result. The purpose of this is to bring about certain economies and increased efficiency in the subsequent refining process. Obviously, if additional impurities can be eliminated in the raw sugar portion of the process to yield a higher purity raw sugar, there will be less burden on the subsequent refining portion of the process and higher yields of refined sugar can be obtained. This is a feature which is of great practical and technical importance and will be referred to again later in this specification.

The raw sugars coming from the centrifugals 22 and 25 are now preferably weighed, as by being passed to the scales 33, from which they are sent to the mingler 34. Here the raw sugars are mingled either with the run-offs, meaning that portion of the syrup resulting from the spinning of the raw sugar in the centrifugal as referred to later in this specification and before any wash water has been added, or with the wash resulting from the addition of wash water to the raw sugar being spun in the centrifugals, or with a mixture both of the wash and the run-off, depending upon the particular circumstances and the particular results desired. The effect of so mingling the raw sugars with the run-off, or with the wash or affinations, or with both, is to permit a higher purity sugar to be obtained from the centrifugals subsequently referred to. The mingled raw sugar and syrups go to the mixer with which is associated a battery of wash centrifugals which receive successive portions of the mingled sugars and syrups according to their capacity and spin the same so as to yield a higher purity raw sugar, generally from about 98.5 to about 99 purity. By purity is meant the percentage of sucrose contained in the total soluble solids. It may here be stated that either the run-off or the wash or both the run-off and the wash from the wash centrifugals may be termed "affinations".

I have discovered that by reintroducing a part or all of the wash or affinations from the wash centrifugals 36 back into the stream of juices or syrups, preferably into the stream of syrups preceding their entry into the first raw sugar pan A, or by introducing a part or all of such wash or affinations directly into the first raw sugar pan A or even into one of the other raw sugar pans, certain very important economies resulting in increases in yield and savings in operating costs may be effected. In certain cases the wash or affinations obtained from the wash centrifugals 36 may be distributed amongst the various raw sugar pans in any desired proportions, depending upon the operating conditions prevailing in the plant at the particular time. I prefer that the affinations obtained from the wash centrifugals 36 be added to the stream of meladura for introduction into the raw sugar pan or pans. However, depending upon the purity and density of the affinations, other procedure or procedures may at times be advisable. In general, it may be stated that the point or points of reintroduction of the affinations back into the stream of juices or syrups should correspond in purity and density to the purity and density of the affinations themselves. It may here be stated, however, that part or all of the affinations, with or without part or all of the run-offs from the last strike or strikes of refined or granulated sugar may be introduced back into the process at any desired point or points, such as at the point or points where the maceration waters are added.

It may here be further stated that the affinations from the wash centrifugals 36 may, instead of being introduced into the syrup stream directly at one or more points therein, be stored or separately collected for introduction into one or more of the raw sugar pans themselves with or without the admixture of meladura or other portion of the juice or syrup stream. This latter procedure may be followed either before or after meladura has been admitted to the raw sugar pan for conversion into raw sugar. In other words, the stream of meladura, for example, and part or all of the affinations, may be simultaneously or successively treated in such a manner, however, as to bring about the utmost cooperation and increase in efficiency in the handling of these two sources of sucrose. As will be pointed out later, the residual run-offs from the refined or granulated sugar strikes may be similarly treated.

It will thus be seen that by the reintroduction into the raw sugar portion of the process of either the affinations or the residual run-offs from the refined or granulated sugar, as subsequently referred to in detail herein, the problem of how to dispose of these residual syrups and affinations, ever present in the usual sugar refinery and constituting one of the most serious problems in such refineries, as well as bringing about a certain lack of economy and also certain wastages of sugar values, is eliminated in a very efficient and highly economical manner. It may here further be stated that under certain conditions the residual run-offs from the refined or granulated strikes, instead of being added to one or more of the raw sugar pans, may be returned to the evaporators or sent to the seed crystallizers. The same is true of any portion of the affinations obtained from the wash centrifugals 36. In general, it should be stated, however, that the residual syrups or any part of the same reintroduced into the raw sugar portion of the process should be introduced at the point or points requiring least handling and thus minimizing mechanical and other losses.

From the wash centrifugals 36 the washed raw sugar, now of a purity of from about 98.5 to about 99, goes to the melter 37 where it is dissolved in water at a temperature of from about 175 to about 190 degrees F. and is converted into a syrup of from about 30 to 32 degrees Beaumé. From the melter 37 the syrup may pass through a strainer 38 for the removal of foreign substances in suspension in it. From the strainer 38 the melt goes to the mixing tanks 39 where is added the purifying and filtering medium which is utilized to remove substantially all of the color from the melt. I prefer for this purpose to use an activated decolorizing vegetable carbon, preferably the carbon known to the trade as "Suchar" which has many superiorities for the desired purpose. This carbon is the well-known and highly activated vegetable carbon derived from leached lignin residues and which is described and claimed, together with the process for making the same in applicant's patent entitled "Electric furnace product", issued February 5, 1929, and bearing Patent No. 1,701,272. From the mixing tanks 39 the syrup, with the Suchar or other decolorizing, purifying and filtering medium in suspension therein, is passed to the filters 40. Here the suspended Suchar or other decolorizing, purifying and filtering medium is removed from suspension, carrying with it impurities and coloring matter, and a substantially pure water-white syrup passes to the bag filters 41 for the removal of any foreign substance which may be in suspension and thence to the white sugar pan 42. In the white sugar pan D the decolorized and purified melt is subjected to a series of crystallizations resulting in successive batches or "strikes" of sucrose crystals.

The first batch or strike of refined or granulated sugar results from the melt itself directly, the second batch of refined or granulated sugar from the first run-off from the first batch of sucrose crystals, the third strike or batch of refined or granulated sugar from the second run-off, the fourth strike or batch from the third run-off and the fifth strike or batch from the fourth run-off, etc. Generally only four or five strikes or batches of refined or granulated sugar are obtained in this way. It may here be stated that instead of treating the successive run-offs separately for the crystallization of refined or granulated sugar therefrom, additional batches of decolorized and purified melt may be added to the white sugar pan D and evaporation continued until seed crystals are formed, after which one or more of the run-offs from the white sugar pan may be added and further crystallization effected at the expense of the sucrose values contained in the run-offs. The exact manipulation of the decolorized and purified melt and of the run-offs from the white sugar pan D will, of course, depend on the quality of sugar desired and the economies which may be effected in any particular set of circumstances by a particular type of manipulation. It may here be stated that each subsequent run-off will contain more color and more impurities than the preceding run-off. Accordingly, the sugar formed from such successive run-offs will be slightly darker in color.

As already indicated earlier in this specification, I have discovered that at the point where a marketable white or granulated sugar of standard quanlity may no longer be economically produced from the last run-off or run-offs or mixtures of the same from the white sugar pan, such run-off or run-offs may be reintroduced into the raw sugar portion of the process for reconversion into raw sugar in the manner already indicated above. It will thus be seen that where affinations or run-offs, or other types of residual syrups, are obtained by the process of the present invention in such form as not to permit further economical conversion directly into white or refined sugar. the same may be economically reintroduced into the system for reconversion into raw sugar with the utmost economy and with the maximum yield and saving of sugar values. The only sugar-containing substance which, therefore, leaves the process not in the form of refined or granulated sugar of at least standard quality is the final molasses 30 previously referred to. It may here be stated that the final molasses made by the methods of the present invention, instead of being of a purity of from about thirty-eight (38) to about forty-four (44), generally averaging about forty (40) percent., is of an average purity of only from about twenty-eight (28) to about thirty-two (32), generally about thirty (30) percent., the difference in purity being made up by additional refined or granulated sugar obtained by means of the methods of the present invention.

I have indicated the first run-off from the white sugar pan 42 by reference character 43, the second run-off by reference character 44, the third run-off by reference character 45 and the fourth run-off by reference character 46. These run-offs result from the treatment of the mixture of sucrose crystals and residual syrup in the centrifugals 47 with which is associated the mixer 48 which receives the mixture of crystals and syrup from the white sugar pan 42 and sends the same into the centrifugals 47. I have indicated the last run-off, which may not economically be converted into refined or granulated sugar, by reference character 49.

50 indicates a storage bin which receives the successive batches of white sugar or sucrose crystals for transmission to the granulator 51 which is in the nature of a dryer which removes substantialy all of the residual moisture from the sucrose crystals and converts the same into what is commonly known as refined or granulated sugar. From the granulator or dryer 51 the granulated sugar passes to a cooler 52, the granulator or dryer 51 being generally provided with a stream of dry heated air to properly perform the drying operation. From the cooler 52 the granulated sugar passes to the scales or other weighing mechanism from which it may pass to bagging machinery or other packing mechanism in the form of commercial white or granulated sugar of at least standard quality.

This completes the description of the aforesaid illustrative embodiment of the present invention. It will be noted that by means of the present invention, as exemplified in the aforesaid illustrative embodiment of the same, all of the residual syrups are returned to the raw sugar portion of the process at that point or points of the same where such introduction may most economically and conveniently be effected. The process is a unitary and substantially continuous one and is cyclic in its nature. All of the by-products from the manufacture of the refined or granulated sugar, which is itself made from the raw sugar, are reintroduced into the raw sugar portion of the process so that the process is a cyclic one, its two sole products being refined or granulated sugar of at least standard quality and final molasses of very low purity. In this way the numerous sources of loss and wastage referred to above resulting from the methods of manufacturing refined sugar as hitherto practised are avoided and the various economies and advantages referred to above in connection with the methods of the present invention are rendered possible and made altogether practicable. Other superiorities and advantages of the methods of the present invention, particularly as exemplified in the aforesaid illustrative embodiment of the same, will readily occur to those skilled in the art to which the present invention relates.

Figure 2:
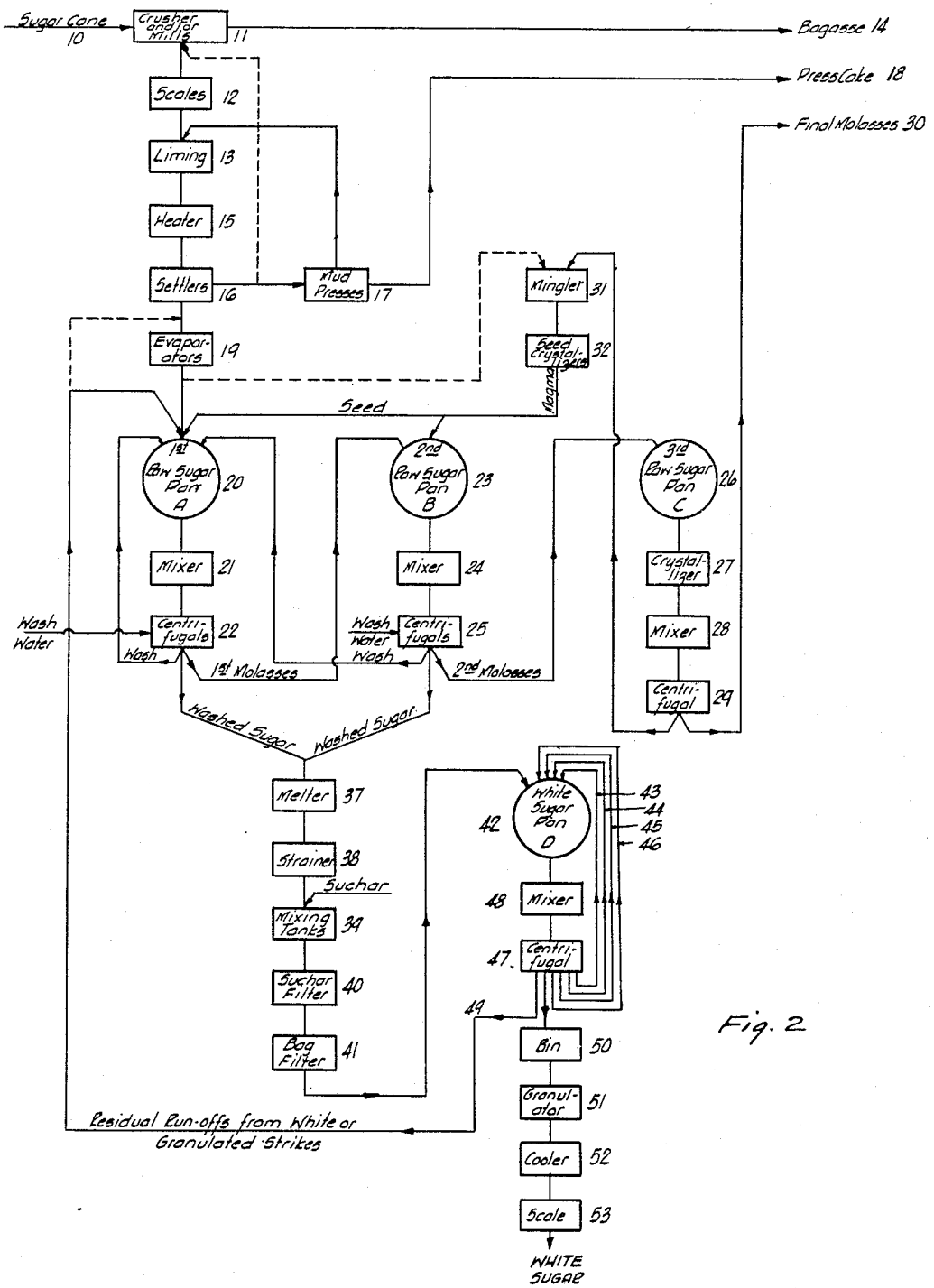
Fig. 2 is a diagrammatic view exemplifying another embodiment of the methods of the present invention.

Referring now to the modified form of the method diagrammatically illustrated in Fig. 2 of the drawings, as there shown the process, down to the treatment of the respective batches of raw sugar in the centrifugals 22 and 25 may be substantially identical with the process described above and diagramatically illustrated in Fig. 1 of the drawings. However, in connection with the form of the method now being described, after the massecuite in the centrifugals 22 and 25 has been spun, with the elimination of the first and second molasses which go to the second raw sugar pan B and to the third raw sugar pan C, the raw sugar batches remaining in the centrifugals 22 and 25 are washed by the addition of sufficient wash water, and the washes or affinations thus obtained are preferably reintroduced directly into one or more of the raw sugar pans, preferably into the first raw sugar pan A. This arrangement permits the elimination of the mingler 34, the mixer 35 and the wash centrifugals 36 forming a part of the process shown in Fig. 1 of the drawings.

From the centrifugals 22 and 25 the washed raw sugar now passes through substantially the same treatment as has been described for the washed raw sugar coming from the wash centrifugals 36 in the form of the method described above and diagrammatically shown in Fig. 1 of the drawings. That is, the mixed washed raw sugars coming from the centrifugals 22 and 25 now pass to the melter 37 where it is dissolved in water at a temperature of from about 175 to about 190 degrees F. and is converted into a syrup of from about 30 to about 32 degrees Beaumé. From the melter 37 the syrup may pass through a strainer 38 for the removal of foreign substances in suspension in it. From the strainer 38 the melt goes to the mixing tanks 39 where is added the purifying and filtering medium which is utilized to remove substantially all of the color from the melt. From the mixing tanks 39 the syrup, with the Suchar or other decolorizing, purifying and filtering medium in suspension therein, is passed to the filters 40. Here the suspended Suchar or other decolorizing, purifying and filtering medium is removed from suspension, carrying with it impurities and coloring matter, and a substantially pure water-white syrup passes to the bag filters 41 for the removal of any foreign substance which may be in suspension and thence to the white sugar pan 42. In the white sugar pan D the decolorized and purified melt is subjected to a series of crystallizations resulting in successive batches or "strikes" of sucrose crystals.

I have indicated the first run-off from the white sugar pan 42 by reference character 43, the second run-off by reference character 44, the third run-off by reference character 45 and the fourth run-off by reference character 46. These run-offs result from the treatment of the mixture of sucrose crystals and residual syrup in the centrifugals 47 with which is associated the mixer 48 which receives the mixture of crystals and syrup from the white sugar pan 42 and sends the same into the centrifugals 47. I have indicated the last run-off, which may not economically be converted into refined or granulated sugar, by reference character 49.

50 indicates a storage bin which receives the successive batches of white sugar or sucrose crystals for transmission to the granulator 51 which is in the nature of a dryer which removes substantially all of the residual moisture from the sucrose crystals and converts the same into what is commonly known as refined or granulated sugar. From the granulator or dryer 51 the granulated sugar passes to a cooler 52, the granulator or dryer 51 being generally provided with a stream of dry heated air to properly perform the drying operation. From the cooler 52 the granulated sugar passes to the scales 53 or other weighing mechanism from which it may pass to bagging machinery or other packing mechanism in the form of commercial white or granulated sugar of at least standard quality.

The form of procedure just described and illustrated in Fig. 2 of the drawings may have certain definite advantages under certain particular conditions. Otherwise the economies of this form of the method and its advantages in use are substantially the same as in the case of the first form of the method described above and diagrammatically illustrated in Fig. 1 of the drawings.

Figure 3:
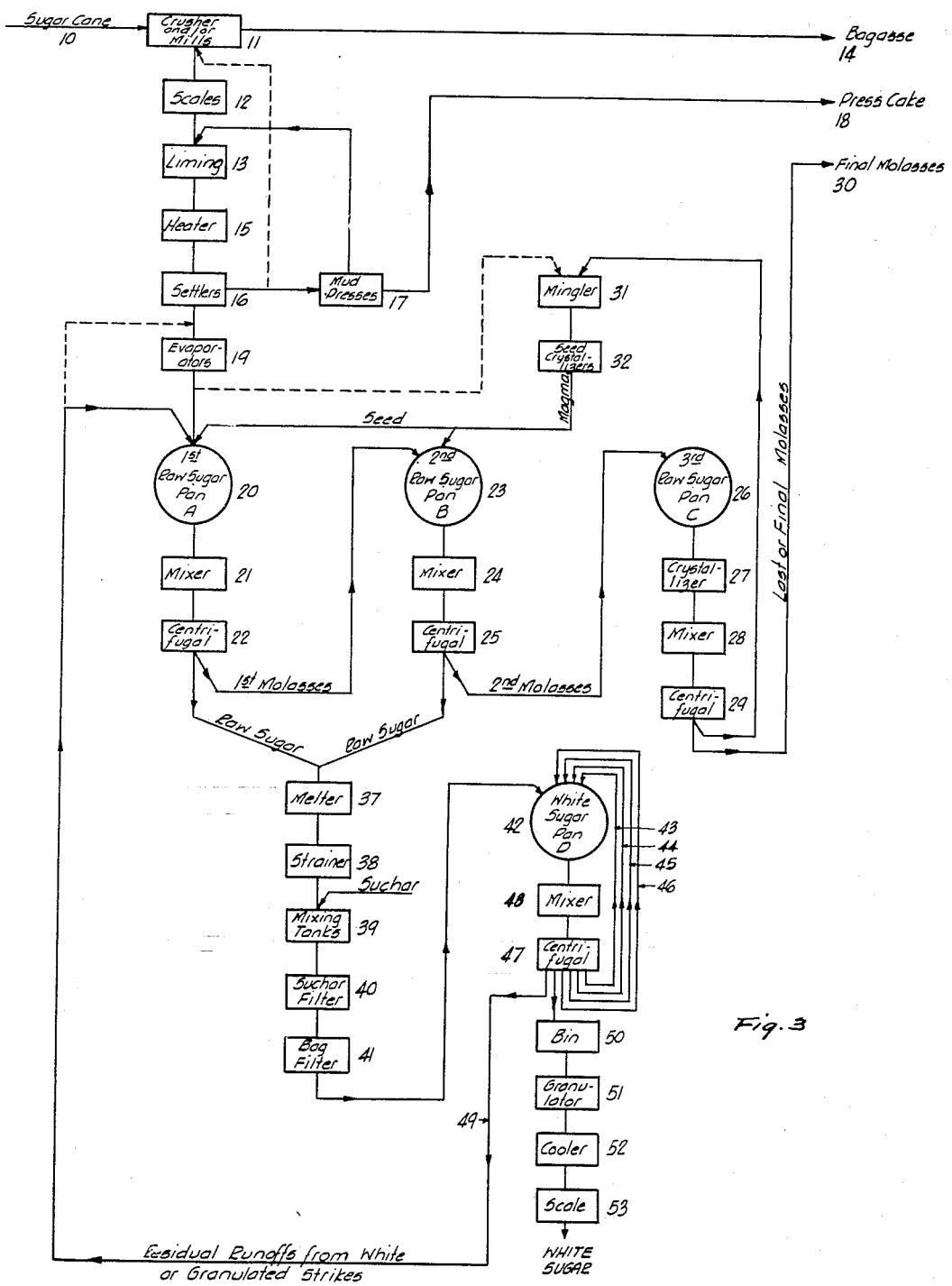
Fig. 3 is still another diagrammatic view exemplifying still another illustrative embodiment of the methods of the present invention.

Referring now to the form of the method illustrated diagrammatically in Fig. 3 of the drawings, the form of method there shown is substantially similar to the form of the method illustrated in Fig. 2 of the drawings except that washing of the raw sugar crystals is entirely avoided for the reason that by the particular form of method here employed a sugar of sufficient purity, generally of from about 98.5 to about 99, is obtained so as to make the washing operation unnecessary. There is here, therefore, only one type of residual syrup, namely the run-offs from the last strikes of white or granulated sugar, which need be reintroduced into the raw sugar portion of the process. This type of raw sugar of higher purity may be obtained in many ways as by more complete defecation, for example, by a double defecation, or by chemical treatment, or by a careful prefiltration, or by a combination of these or other agencies whose purpose is to produce raw sugar of sufficient purity to avoid the necessity of the usual washing operation. Accordingly, as diagrammatically indicated in Fig. 3 of the drawings, the sugar cane 10 passes to the crusher or mills 11, the juice passing to the scales 12 from which they pass to the liming tank or tanks 13, the bagasse leaving the system at 14. From the liming tank or tanks the juices pass to the heater 15 and thence to the settlers 16 from which the settlings pass to the mud presses 17. The juices recovered from the mud presses are preferably returned to the liming tank or tanks 13 for a second defecation treatment. The pressed cake obtained in the mud presses 17 passes out of the system at the point 18. As illustrated in Fig. 3 of the drawings by the dotted line, certain of the sucrose-containing juices derived from the settlers 16 may be returned to the crushers or mills, or both, so as to be re-treated in that part of the system up to the point just described.

From the settlers 16 the defecated juices together with the doubly defecated juices which have been recovered from the mud presses, pass to the evaporators 19 from which they pass to the first raw sugar pan or pan A where "grain" is formed either for the pan A alone or also for the second raw sugar pan or pan B, designated by reference character 23, and also for the third raw sugar pan or pan C, designated by reference character 26, preferably for all three of the raw sugar pans A, B and C. Due to the double defecation or equivalent treatment to which the juices are preferably subjected, the average purity of the sugars produced will approximate ninety-eight (98) or ninety-eight and one-half (98½) per cent. pure, so that the sugar may be melted and refined and thus converted into refined or granulated sugar of at least average standard quality without the necessity of any washing operation.

The mixture of raw sugar crystals produced by the grain out of the syrup or meladura, which is either continuously or in successive batches added to the first raw sugar pan or pan A, is passed to the mixer 21 and thence to the centrifugals 22 from which the raw sugar passes to the melter 37, the first molasses obtained from the centrifugals 22 passing to the second raw sugar pan or pan B. Here raw sugar is formed on the grain which has preferably previously been added, the mixture of raw sugar and molasses passing to the mixer 24 from which it passes to the centrifugals 25 from which the raw sugar also passes to the melter 37 previously referred to.

From the second raw sugar pan or pan B the second molasses passes to the third raw sugar pan or pan C, designated by reference character 26, in which grain has preferably previously been added from the first raw sugar pan or pan A in the manner already described above. From the third raw sugar pan or pan C the mixture of raw sugar crystals and final molasses passes to the crystallizer 23, thence to the mixer 28 and thence to the centrifugal 29, final molasses leaving the system at the point 30. The raw sugar crystals are passed to the mingler 31 where they are mixed with a suitable proportion of their weight of meladura or syrup from the evaporators 19 to form a magma which is passed to the seed crystallizers 32 for storage until required for use as seed for pans A and B as previously described.

The batches of raw sugar coming from the centrifugals 22 and 25 pass to the melter 37, thence to the strainer 38, thence to the mixing tanks 39 where "Suchar" or like highly activated carbon of vegetable origin is added in the desirable amount, thence to the "Suchar" filter or filters 40, and thence to the bag filter or filters 41 from which the decolorized, deodorized and otherwise purified syrups pass to the white sugar pan or pan D, designated by reference character 42, from which successive strikes of refined or granulated sugar of at least standard average purity are obtained, the successive run-offs 43, 44, 45 and 46 from the first, second, third and fourth strikes, respectively, of refined or granulated sugar being returned to the white sugar pan or pan D for conversion into refined or granualted sugar. In each case, the massecuite is sent to the mixer 48 and thence to the centrifugals 47, the last run-off 49 from the fifth or last strike of refined or granulated sugar being, in accordance with the principles of the methods of the present invention, returned to the first raw sugar pan or pan A or otherwise reintroduced into the raw sugar portion of the process so as to have a portion at least of the sucrose values therein reconverted into raw sugar for subsequent treatment in the process as refined or granulated sugar of at least average or standard quality.

From the centrifugals 47 the refined or granulated sugar is passed to the bin 50, thence to the granulator 51, thence to the cooler 52 and thence to the scales 53 from which it may be passed to the bagging or other packaging machine as the final product in the manner already described above.

This completes the description of the illustrative embodiment of the methods of the present invention illustrated in Fig. 3 of the drawings. It will be noted that by means of the form of the method just described, the washing of the raw sugars and thus the production of affinations is entirely avoided, the system permitting the production of a grade of raw sugar of higher than average purity, as from about ninety-eight (98) to about ninety-eight and five-tenths (98.5) per cent. pure, raw sugar of this purity permitting its refining in the production of refined or granulated sugar of at least average standard quality without the washing of the raw sugar and the consequent production of affinations. On the other hand, the same or equivalent economies are rendered possible by means of this form of the method since the residual run-offs from the refined or granulated sugar strikes are returned to the raw sugar portion of the process for reconversion into raw sugar which is in turn converted into additional refined or granulated sugar, thus effecting the economies and rendering possible the advantages described in the earlier portions of this specification.

This complete description of the third remaining one of the aforesaid illustrative embodiments of the methods of the present invention. It will be noted that this form of the method also presents the advantages and possesses the economies in operation and in use claimed for the invention generally and for the first two illustrative embodiments of the same described above. It may here also be stated that throughout the specification describing and the drawings exemplifying the aforesaid illustrative embodiments of the methods of the present invention, wherever I have referred to a particular apparatus or type of apparatus, as to a number of pans, it is to be understood that these features of apparatus typify or symbolize the operations or manipulations than specifically the structures constituting such devices. For example, in a smaller sugar mill, a single pan or two pans or, say, three pans may be utilized for performing the various operations symbolically represented by the four pans illustrated in the first three figures of the drawings. Similarly in a larger mill, four (4), five (5) or six (6) pans may be utilized. These merely symbolize the functional character of the various features of the apparatus referred to in the specification and illustrated in the various figures of the drawings. It may here be stated that I prefer, in practising the aforesaid illustrative embodiments of the methods of the present invention, to employ the variety of highly activated vegetable carbon known in the market as "Suchar" and derived from leached carbonized lignin residues by the methods and by the use of the apparatuses described and claimed in my copending applications respectively entitled "Method of treating carbonaceous material in an electric furnace or the like", "Electric furnace product" and "Process for the treatment of comminuted carbonaceous materials and the like, in electric furnaces and the like", bearing the respective serial numbers of 633,640, 633,641 and 633,643, these applications all having been filed April 21, 1923.

Referring now to the aforesaid illustrative form of apparatus as illustrated in Figs. 4A and 4B of the drawings and more fully described and claimed in my copending application refered to above, 100 indicates a car dump or similar device for unloading the sugar cane or like sucrose-bearing material onto the auxiliary carrier 101. The car dump 100 may be in the form of a dump car suitably constructed to discharge the sugar cane or the like coming from the field onto the auxiliary carrier 101. From the auxiliary carrier 101 the sugar cane is conveyed to the cane carrier 102 which elevates the cane so as to discharge it from its upper end into the crushers and mills which serve to break up and macerate the cane and to extract by pressure the sugar juices contained therein. This apparatus has been generally indicated by reference character 103. The crusher itself has been indicated by 104.

It may here be stated that while only one crusher has been shown, a plurality of them may be used. The mills themselves have been indicated by reference character 106. These mills embody a plurality of series of rolls, three such series, each consisting of three rolls, being here shown. It should, however, be understood that any number of series consisting of any number of rolls each may be employed. 107 indicates intermediate conveyors which take the bagasse, still containing sugar juice, from the preceding set of rolls and elevate them into operative position for action upon them by the succeeding set of rolls. Two such intermediate conveyors 107 have been here shown but it is to be understood that their number will depend upon the number of sets of rolls employed.

The juices from the different stages of the crushing and milling operations are received in the juice trough 108 which may be covered by a screen 109 for removing bagasse and other solid impurities. The juice trough 108 is provided with the lateral troughs or canals 110 and 111 which are preferably suitably inclined and lead the juices into the juice trough 108. As here shown, the different fractions of juices derived from the crushers and also from the mill rolls are, as is generally the case, all commingled.

It may here be stated, however, that under certain conditions it may be desirable to keep separate and distinct the different fractions of juices coming from the different crushers and mills, or some of them, since their purity and concentration vary and permit, often, of more economical handling in separate batches if the operation is large enough. That is, the composition of the juices, both in sugar content and in the nature and amount of the impurities present, varies with each successive operation to which the cane is subjected. Accordingly, if the operation is extensive enough, it may be more economical and otherwise highly desirable to subject to separate recovery operations the sugar values in the different fractions of the juices coming from the different sets of rolls. The further course of the juices will be fully described later in this specification.

Returning now to the waste material or bagasse from which the juices have been extracted to the desired degree, the same is received from the last set of mill rolls 106 by the bagasse drag 112 by means of which it is elevated onto an endless conveyor 113 which may serve to carry the bagasse either to a bagasse storage bin or may discharge the same into the boilers 114 where the bagasse may serve as fuel for one or more of the subsequent heating operations. It may here be stated that the exact arrangement and number of the crushers and mills will depend upon the extensiveness of the operations and also upon the character of the cane or equivalent material being treated, some varieties of sugar cane being softer and more easy to handle than others and others being much harder and thus requiring a more extensive crushing and milling operation for the substantially complete extraction of the juices contained therein. It may here be stated that the bagasse, instead of being burned, may be converted into wall-board, paper or any other desired material, in which case the fuel for the boilers 114 may consist of any desired material. The juices from the juice trough 108, now having been subjected to the preliminary screening operation by means of the screen 109, pass out through suitable conduits 115, their passage being facilitated by means of the juice pump 116 which may, however, in certain cases either be omitted or may be supplemented by additional means for effecting the desired transfer of the juices. In order that the operation may be properly controlled, the amount of juices should be clearly and accurately determined, as by being weighed. For this purpose I may utilize the juice scale 117 which may be of any desired construction. From the juice scale 117 the juices pass to the liming tank or tanks 118.

It may here be stated that the juices in their raw state, as they enter the liming tank or tanks 118, contain a considerable variety of impurities which may be roughly classified as follows: In the first place, they contain, in addition to the sucrose juices, certain soluble organic matters in the nature of salts of organic acids and certain organic acids themselves. The amounts of these various impurities vary with the different types of cane and with the condition of the cane at the time it is subjected to the recovery operations. In the second place, the juices also contain certain colloidal substances which are in suspension and which give to the juices a considerable part of the undesirable color, odor and taste which they have. These colloidal substances also impede filtration and general purification and their removal in an efficient and economical manner is highly desirable. The juices also contain waxes, certain soluble and insoluble mineral substances, particularly silica and silicates, and certain insoluble organic substances, such as cell tissues from the sugar cane in the form of particles of bagasse and the like.

In order to remove, initially, a considerable part of the suspended matter and also to neutralize the organic and other acids that may be present to a point which will substantially prevent such acids from inverting the sucrose which is a crystallizable disaccharide and converting the same into noncrystallizable monosaccharides, I prefer to subject the juices to treatment with a chemical or chemicals which will serve to remove a considerable portion of the undesirable acid and other impurities. For this purpose I may, for example, subject the juices to the operation known as "liming", by which I mean the addition to such juices of lime in suitable condition and quantity depending upon the character of the juices being treated. The lime may be a fairly high grade lime in lump or powder form, preferably in the condition of milk of lime, made by mixing the lime in the lump or powder form with the desired amount of water. It may here further be stated that instead of lime an equivalent substance or substances may be employed for this purpose.

From the liming tank or tanks 118 the limed juices are sent, as by means of the pump 119, through the conduit 120 to the juice heater 121. The juice heater 121 may be heated by steam coils or other means so as to bring the limed juices to a temperature of from about 210 to about 215 degrees F., that is, near, at or slightly above the boiling point of the juices. The effect of this heating action is to facilitate the liming action and also to coagulate the substances, some of them of an alluminoidal character, which may be coagulated by heat, especially in the presence of lime, so as to bring about their precipitation in the form of a floc or slime which may be separated in the subsequent treating operations now to be described.

From the juice heater 121 the heated limed juices pass through the conduit 122 to the defecators being discharged into the defecators through the branch pipes 123. Generally the defecators, which have been designated by reference characters 124, are filled one at a time. The defecators 124 serve the purpose of effecting the separation of clear juices from the scums, slimes and muds which result from the liming and heating operations.

Any desirable type of defecators which will effect the separation of the maximum amount of clear juices from the slimes and muds may be employed. In general, it may be stated that the principle of operation of a defecator is that it permits the withdrawal at different levels of clear juices from an underlying layer of stratum of mixed juices, slimes and muds. At the same time, the defecators permit the withdrawal of such clear juices free from the scum that floats on the top of the heated limed juices. The clear juices pass out to the conduit 125 by means of the branch pipes 126 and from the conduit 125 by means of the clear juice conduit 127 to the evaporators.

The scums, slimes and muds contain a considerable amount of economically recoverable sucrose sugar values. Accordingly, I prefer to discharge such scums, slimes and muds through the branch pipes 128 into the settlings conduit 129 which communicates with the branch conduit 130 which in turn discharges the scums and settlings into a conduit 131 having the branches 132 which communicate with the several settling tanks or clarifiers 133. It may here be stated that both the tank 124, as well as the tanks 133, may be termed settling tanks or clarifiers, the former series performing the first portion of the clarifying action and the second series the second portion of the clarifying action. Preferably the settlings are discharged into one settling tank 133 after the other with the admixture, generally, of additional water and additional lime, preferably in the form of milk of lime. The purpose of this is so that the scums and settlings, which contain a higher concentration of impurities than the original juices, shall be further subjected to a treatment which will cause the further elimination of such impurities and the production of a further amount of clear juices which may be economically treated for the recovery of their sucrose values.

From the settlers 133 the clarified juices pass through the branch pipes 134 into the conduit 135 which joins the stream of clarified juices passing through the conduit 127. The residual juices then remaining with the muds and slimes and the scums, may be passed through the branch pipes 136 to the conduit 137 and thence by means of the pump 138 through the pipe 139 to the filter presses here generally designated by reference character 140. It may here be stated that any suitable type of filter press may be employed for this purpose, the object being to effect a separation of the residual juices in a clarified condition from the mixed muds, slimes and scums which are recovered in the form of a press cake carried away from the filter presses by the conveyor 141. The clarified juices pass out of the filter presses 140 by means of the discharge outlets 142 into the juice troughs 143 which communicate, by means of the branch pipes 144, with the juice conduit 145 which connects with the main juice conduit 127 so that clarified juices from all these different sources pass together to the evaporator supply tank 146.

As indicated in dotted lines in Fig. 4A of the drawings, the clarified juices from the filter presses 140, as also the clarified juices from the settlers 133, instead of being sent directly to the main juice conduit 127 and thus to the evaporator supply tank 146, may, particularly in view of the fact that they generally contain an excess of lime, be sent instead to the liming tank or tanks 118, thus reducing the amount of lime which would have to be added to the liming tank or tanks and thus also causing the juices from the filter presses 140 and from the settlers 133 to be treated all over again for their further purification.

From the evaporator supply tank 146 the clarified and now substantially neutral juices pass to a series of evaporators, preferably of the multiple effect type. While any evaporating arrangement may be utilized, I prefer to use the multiple effect shown. However, it is to be clearly understood that any desired number of evaporators and any other type of arrangement may be employed. As here shown by way of example merely, the first evaporator has been designated by reference character 147, the second by reference character 148, the third by reference character 149 and the fourth by reference character 150. The arrangement is such that evaporation takes place in a partial vacuum with the degree of the vacuum increasing in successive evaporators. The result is therefore that the juices boil at sucessively lower temperatures in the successive effects that the vapors given off from a preceding effect serve to boil the juices in the next succeeding effect. The vapor from the last effect is sent to a condenser to maintain the desired degree of vapor in the last effect.

151 is a vapor pipe connecting the effects 147 and 148. 152 is a vapor pipe connecting the second effect to the third effect and 153 is a vapor pipe connecting the third effect to the fourth effect, 154 being the vapor outlet leading to the condensor.

The clarified juices pass through the pipe 155 to the first effect 147 and the concentrated juices pass through the pipe 156 to the second effect 148 from which they pass by the pipe 157 to the third effect 149, their density increasing from one effect to the other. From the effect 149 the concentrated juices pass by the pipe 158 to the last effect 150 from which the "meladura" or syrup of the most concentrated juices passes by means of the outlet pipe 159 to the pan tanks and thence to the remaining portions of the apparatus as illustrated in Fig. 4B of the drawings.

It may here be stated that under certain conditions the juices are kept slightly acid and under other conditions they are kept slightly alkaline. In general the hydrogen ion concentration of the juices should correspond to a pH reading of between about 6.8 to about 7.2. It may here also be stated that the density of the "meladura" or syrup may vary within a considerable range but is generally between about 30 and about 32 degrees Beaumé. Its color also varies somewhat, depending upon the exact nature and amount of impurities contained therein and is generally of a dark brown syrupy nature.

As already indicated above, the "meladura" or syrup passes from the evaporator 159 through the pipe 159 to the pan tanks 160 shown in Fig. 4B of the drawings where it is stored for subsequent boiling in the vacuum pans. A charge of meladura is drawn from the pan tanks 160 through the branch pipes 161 and the main pipe line 162 into vacuum pan A, reference 163. This charge of syrup is boiled under a vacuum of from about 26 to about 27 inches until very fine crystals are formed due to the concentration of the syrup. These fine crystals, as already stated, are generally termed "grain". A portion of this grain is usually passed through pan A to pans B and C. After passing grain from pan A to pans B and C, the meladura is again charged into pan A either in batches or in a continuous stream. By a careful manipulation of the rate of boiling in pan A by varying the flow of steam and the degree of vacuum, the grain in pan A is made to increase in size at the expense of the sucrose in the incoming meladura until the mass of sugar crystals and of mother liquor fills the pan A. The mass of sugar crystals and the mother liquor is usually termed "massecuite".

After the massecuite has been brought to the proper density, the vacuum is broken and the massecuite is discharged from pan A into mixer 168 through the canal 166. Batches of the massecuite are fed from mixer 168 into centrifugals 167, the size of the individual batches depending on the capacity of the centrifugals. In the centrifugals 167 the sugar crystals are separated from the mother liquor, the mother liquor passing through the perforations in the centrifugals into the canal 178. The mother liquor in this form is generally known as "first molasses". The sugar crystals are discharged from the centrifugals 167 into the conveyor 180 in the form of raw sugar. The "first molasses" is pumped from the canal 178 by means of pump 179 through the pipe 177 to the pan tanks 176 where it is stored to be used as needed in pan B, reference character 164.

Pan B, after having received a charge of grain from pan A draws first molasses either in batches or in a continuous stream from pan tanks 176 through the pipe 225. By a careful manipulation of the steam and the degree of vacuum in pan B, the grain in pan B is made to grow at the expense of the sucrose values in the "first molasses". The first molasses is fed to pan B until the grain has grown to the point where the mass of sugar crystals and of mother liquor fills the pan B. After the mass of sugar crystals and mother liquor, generally termed "massecuite", has been concentrated to the desired degree, the "massecuite" is discharged from the pan into the centrifugal mixer 168 through canals 169 and 166 or into one or more of the crystallizers 171 through the canal 170 and the discharge spouts 172.

The "massecuite" discharged into the crystallizers 171 is left there to cool, generally for a period of from about three (3) to about four (4) hours. During this period of cooling the size of the crystals continues to grow at the expense of the sucrose in the mother liquors. The "massecuite" is then discharged from the crystallizers 171 into the centrifugal mixer 168. The massecuite in the centrifugal mixer 168 is fed to the centrifugals 167 where the sugar crystals are separated from the mother liquor, the mother liquor passing through the perforations in the centrifugals into the canal 178. The mother liquor in this form is known as "second molasses". The sugar crystals are discharged from the centrifugals 167 into the conveyor 180 in the form of raw sugar.

The "second molasses" from the canal 178 is pumped by pump 179 through pipe 177 to the pan tanks 226 where it is stored to be used as needed in pan C, reference character 165. Pan C after having received "grain" from pan A, is fed with "second molasses" from the pan tanks 226 through the pipes 227, as previously described for pans A and B, and the "grain" in pan C is made to grow at the expense of the sucrose in the "second molasses" until the "massecuite" fills the pan and has been coiled to the desired density. The "massecuite" from pan C is discharged into the canal 228 through which it flows through the spouts 172 into the crystallizers 173. The "massecuite" remains in crystallizers 173 until it has cooled to approximately room temperature, which usually takes from about three (3) to about five (5) days. During this period of cooling the sugar crystals continue to grow at the expense of the sucrose in the mother liquor. The cooled "massecuite" from the crystallizers is discharged into the mixer 175 through the canal 229. From the mixer 175 the massecuite is fed in batches to the centrifugals 174 where the sugar crystals are separated from the mother liquor, the mother liquor passing into the canal 188. In this form the mother liquor is termed "final molasses". The final molasses is pumped from canal 188 by means of pump 189 to a storage tank where it is held until sold or otherwise disposed of.

The sugar crystals are discharged from the centrifugals 174 into the conveyor or mingler 190 where they are mingled with first molasses to form what is generally known as "magma". The magma is pumped by magma pump 191 through the conduit 192 to the mixer 168 where it is mixed and treated with massecuite from pans A or B. The raw sugar, which has been discharged from the centrifugals 167 into the conveyor 180, is delivered to the raw sugar elevator 181 which discharges into mingler 182 where it is mingled with affinations from the centrifugals 184. The mixture of raw sugar and affinations is discharged into the wash centrifugals mixer 183 from which it is fed in batches to the centrifugals 184. By the application of water to the individual batches which have been fed to the centrifugals a large portion of the volume of molasses which surrounds the sugar crystals is washed off, the wash water, together with the molasses thus removed from the sugar crystals, passing through the perforations in the centrifugals into the canal 185 from which it is pumped by pump 186 through the pipe 187 to the pan tanks 160. The quantity of water used in washing the sugar crystals in the centrifugals 184 is controlled so that the washed sugar will have a purity of from about ninety-eight and one-half (98½) to about ninety-nine (99) degrees polarization. The washed sugar is discharged from the centrifugals 184 into the conveyor 193 which discharges washed sugar into the washed sugar elevator 194 which delivers the sugar into the washed sugar bin 196. Washed sugar is fed from the washed sugar bin 196 into the first melter 197 where it is dissolved with "sweet water" or fresh water to the proper density, usually about thirty (30) degrees Beaumé. "Sweet water" is water containing a small percentage of sucrose which has been recovered by washing the carbon used in the refining process which will be described later.

The syrup which is obtained by dissolving the washed sugar in the "sweet water" or fresh water in the first melter 197 is pumped by pump 200 through pipe 201 to the strainer 203 where foreign particles in suspension are removed. The syrup passes from the strainer 203 to the first melt storage tank 205 from which it is delivered as required to the first stage mixing tanks 207 where it is mixed with once used carbon from the second stage filters. The mixture of carbon and syrup is heated usually by means of steam coils, to a temperature of from about one hundred and eighty (180) to about one hundred and ninety (190) degrees F. After heating, the mixture of carbon and syrup passes through the pipes 208 to the pumps 209 which deliver the mixture through the pipes 210 to the first stage filters 211. I prefer to use for this purpose a type of filter known as the "Auto" filter, though any filter which is suitable for the satisfactory removal of the carbon used for refining may here be employed.

The first stage filters 211 deliver a partially decolorized syrup through the discharge outlets 212 into the troughs 213. This partially decolorized syrup will be termed "first filtrate". The first filtrate flows through the pipes 214 to the first filtrate storage tank 215 from which it is drawn as required into the second melter 198. Washed sugar from the washed sugar bin 196 is dissolved in the first filtrate fed to the second melter 198 to increase the density of the syrup, usually to a density in the neighborhood of about thirty-four (34) degrees Beaumé.

The more dense syrup thus obtained in the melter 198 is pumped by pump 199 through pipe 202 to the strainer 204 from which it is delivered into the second melt storage tank 206. The liquor is drawn from the second melt storage tank 206 through pipe 230 to the second stage mixing tanks 216 where revivified or virgin Suchar carbon is added in amounts as required to give the desired degree of decolorization. This mixture of virgin Suchar carbon and syrup is heated usually by means of steam coils to a temperature of from about one hundred and eighty (180) to about one hundred and ninety (190) degrees F. The mixture of carbon and syrup, after being heated, passes through pipes 217 to the pumps 218 and is pumped through the pipes 219 to the second stage filters 220. A decolorized and purified syrup is delivered from the second stage filters through the discharge outlets 221 to the troughs 222 from which it flows through the pipe 223 to the bag filter 224 where any foreign particles which may be in suspension are removed.

The liquor thus obtained, termed "final filtrate", flows through the pipe 231 to the final filtrate tank 232 and thence through pipe 233 to the pan tanks 234. The final filtrate is fed from the pan tanks 234 through the pipe 235 to the white sugar pan D, reference character 236, where it is boiled to white sugar, in the usual manner. The massecuite or mass of white sugar crystals and mother liquor resulting from the boiling in pan 236 is discharged into the white sugar centrifugal mixer 237 by means of the chute 238. Batches of the massecuite are fed from the white sugar centrifugal mixer to the white sugar centrifugals 239 where the sugar crystals are separated from the mother liquor. The white sugar is discharged from the centrifugals 239 into the conveyor 240 which conveys the sugar to the white sugar elevator 241. The sugar is elevated by means of this elevator and discharged into a distributing conveyor 242 which distributes the white sugar to any of the compartments of the white sugar bins 243.

The syrup or run-off which results from the separation of the sugar crystals from the mother liquor in the centrifugals 239 passes to the canal 244 from which it is pumped by pump 245 through pipe 246 to the pan tanks 247. This run-off is boiled to white sugar in the white sugar pan 236 in the same manner as described above for the final filtrate, the white sugar from this boiling being delivered to the white sugar bins 243 in the manner as previously described and the resulting run-off being returned to the pan tanks 247 in the manner previously described. Successive boilings are carried on in this way until the accumulation of color and impurities in the resultant run-off is built up to the point where a similar boiling in the white sugar pan would not yield the quality of sugar desired. This run-off is termed "residual run-off" and is pumped from the canal 244 by pump 248 through the pipe 249 to the pan tanks 160 where it is used for the production of raw sugar.

The white sugar which has been delivered to the white sugar bin 243 is discharged into the conveyor 250 to which it is fed to the granulator or dryer 251 where substantially all of the moisture which the white sugar may contain is removed, after which the dried sugar is delivered to the scale bin 252. The sugar bags or other form of package 253 are filled, usually by means of automatic scales and packing machinery 254, with the dried sugar from the scale bin 252. The packed finished product leaves the plant at this point.

The description which I have given above pertains more particularly to the cyclic treatment of the sugar containing syrups or liquors. I shall now describe the cycle of the carbon or refining agent. The "Auto" or other filters 211 and 220 which I prefer to use for the first and second stage filtrations which I have described above are designated for cyclic operation, a cycle having been completed when a definite quantity of carbon has been deposited on the filtering elements of the filters. The quantity of carbon required for a filter is measured in the measuring hopper 255 from which it is discharged into a conditioning tank 256. Sufficient syrup is added to the carbon in the conditioning tank 256 from the second melt storage tank 206 through the pipe 257 to make up a sludge sufficiently fluid to flow through the pipe 258 to one of the second stage mixing tanks 216. After this charge of carbon has been added to the second stage mixing tank sufficient syrup is drawn from the second melt storage tank 206 into the mixing tank to give the proper proportion of carbon and syrup required for the desired degree of decolorization.

When this mixture of syrup and the measured quantity of Suchar carbon has been completely pumped to the second stage filter 220, as previously described, the filtration cycle of this filter has been completed and the carbon deposit on the leaves or filtering elements of the filter is sluiced through the outlets 259 to the troughs 260 from which it flows through the pipe line 261 to one of the first stage mixing tanks 207 where syrup is added from the first melt storage tank 205, as described above.

When this mixture of syrup and the measured quantity of carbon has been completely pumped to the first stage filter 211 as previously described, the filtration cycle for this filter is completed. The carbon thus deposited on the leaves or filtering elements of the first stage filter has been twice used as a refining agent and although not totally exhuasted, this carbon has been exhausted to a point where it is desirable that it be revivified or reactivated for further use.

Before being subjected to the revivification treatment, it is desirable to recover as much of the sucrose which is held by this carbon as is economical. The feeding of the mixture of the carbon and the syrup having been stopped when the measured amount of carbon has been deposited on the leaves or filtering elements of the filter, water is pumped into the filter and passes through the carbon cake or layer deposited on the leaves or filtering elements. This operation is continued uitil the water has washed from the carbon cake all of the sucrose which it is considered economical to recover. This water, with the sucrose which it has recovered, is termed "sweet water" and passes out of the filter through the outlets 212 into the troughs 262 and by means of the pipe line 263 is delivered to the sweet water tank 264. Sweet water for dissolving the washed sugar in the first melter 197, as previously described, is drawn from the sweet water tank 264 through the pipe 265.

After the carbon has been washed in the filter 211 it is sluiced by means of water jets within the body of the filter through the outlets 266 into the troughs 267 from which it flows through the pipe line 268 to the sludge tank 269. This sludge or mixture of carbon and water is pumped from the sludge tank 269 by a pump to the filter press 271 from which it is delivered in the form of a press cake, containing from 65 to 70 per cent. of moisture, into the hopper 272. The press cake from the hopper 272 is fed to the drier feeding hopper 273 through the canal 274. The press cake from the drier feed hopper 273 is fed either by hand or automatically to the drier 275 where the moisture content is reduced to approximately ten (10) per cent. The drier 275 delivers the dried carbon to the revivifier 276 where the carbon is given an electric treatment by means of which the impurities which it has accumulated through its use as a refining agent are eliminated and it is reactivated to a point where it has recovered all of the refining properties. The revivified carbon thus obtained is conveyed by conveyor 277 to the elevator 278 which discharges it into the revivified Suchar carbon storage bin 279 where it is available for reintroduction into the refining process at the measuring hopper 266 which I have described above.

This completes the description of the aforesaid illustrative form of the apparatus by means of which the aforesaid illustrative embodiments of the methods of the present invention may be conveniently and successfully practiced. It will be noted that such apparatus is simple in arrangement and possesses other economies and advantages in operation, all as will be readily apparent to those skilled in the art to which the present invention relates.

What I claim as my invention is:

1. The process of manufacturing sugar, which comprises the steps of extracting a solution of sucrose from a sucrose-bearing plant, treating said solution of sucrose to obtain a raw sugar therefrom, treating said raw sugar to obtain a refined sugar and a syrup therefrom, and returning said syrup to the process for reconversion into raw sugar.

2. A substantially continuous process for the manufacture of sugar, which comprises the steps of treating a solution of sucrose to obtain a raw sugar therefrom, treating said raw sugar to obtain a refined sugar and a syrup therefrom, and returning said syrup to the process for reconversion into raw sugar.

3. A process for manufacturing sugar, which comprises treating a raw sugar to obtain a refined sugar and a sugar-containing syrup therefrom, treating said sugar-containing syrup to obtain raw sugar therefrom and commingling said last-mentioned raw sugar with a portion of said first-mentioned raw sugar for the simultaneous conversion of said last-mentioned raw sugar and said portion of said first-mentioned raw sugar into refined sugar.

4. A process for manufacturing sugar, which comprises the steps of treating a meladura to obtain raw sugar therefrom, treating said raw sugar to obtain refined sugar and a relatively impure sugar-containing syrup therefrom and returning said relatively impure sugar-containing syrup to said meladura to obtain additional raw sugar therefrom.

5. A substantially continuous process for manufacturing sugar, which comprises the steps of substantially continuously treating successive portions of a meladura to obtain successive batches of raw sugar substantially continuously therefrom, substantially continuously treating said successive batches of raw sugar to obtain refined sugar and successive batches of a relatively impure sugar-containing syrup therefrom and substantially continuously returning said successive batches of relatively impure sugar-containing syrup to further portions of said meladura to obtain additional raw sugar therefrom.

6. A process for manufacturing sugar, which comprises the steps of extracting sugar-containing juices from sugar-bearing plants, treating said sugar-containing juices to convert the same into a meladura, treating said meladura to obtain raw sugar therefrom, treating said raw sugar to obtain refined sugar and a relatively impure sugar-containing syrup therefrom and returning said relatively impure sugar-containing syrup to said meladura to obtain additional raw sugar therefrom.

7. A substantially continuous process for manufacturing sugar, which comprises the steps of extracting sugar-containing juices from sugar-bearing plants, treating said sugar-containing juices to convert the same into a meladura, substantially continuously treating successive portions of said meladura to obtain successive batches of raw sugar substantially continuously therefrom, substantially continuously treating said successive batches of raw sugar to obtain refined sugar and successive batches of a relatively impure sugar-containing syrup therefrom and substantially continuously returning said successive batches of relatively impure sugar-containing syrup to further portions of said meladura to obtain additional raw sugar therefrom.

8. A cyclic process for the manufacture of sugar, which comprises the steps of treating a meladura to obtain raw sugar and molasses therefrom, treating said raw sugar to obtain refined sugar and a run-off therefrom, and returning said run-off to a further portion of said meladura.

9. A cyclic process for the manufacture of sugar, which comprises the steps of treating a meladura to obtain raw sugar and molasses therefrom, treating said raw sugar to obtain refined sugar and affinations therefrom and returning said affinations to a further portion of said meladura.

10. A cyclic process for the manufacture of sugar, which comprises the steps of treating a meladura to obtain raw sugar and molasses therefrom, treating said raw sugar to obtain refined sugar, affinations and a run-off therefrom, and returning said affinations and said run-off to a further portion of said meladura.

In testimony whereof, I have signed my name to this specification this 11th day of June, 1928.

JOHN J. NAUGLE.